United States Patent Office

3,651,127
Patented Mar. 21, 1972

3,651,127
PROCESS FOR THE MANUFACTURE OF PHENYL ESTERS OR MIXTURES OF PHENYL ESTERS AND PHENOL FROM BENZENE
Lothar Hörnig, Frankfurt am Main, Hans-Jürgen Arpe, Kelkheim, Taunus, and Manfred Boldt, Fischbach, Taunus, Germany, assignors to Farbwerke Hoechst Aktiengesellschaft vormals Meister Lucius & Bruning, Frankfurt am Main, Germany
No Drawing. Filed Mar. 8, 1968, Ser. No. 711,475
Claims priority, application Germany, Mar. 17, 1967, F 51,849
Int. Cl. C07c 37/00, 51/32
U.S. Cl. 260—479 R      10 Claims

ABSTRACT OF THE DISCLOSURE

Preparation of phenyl esters and, if desired, phenol by gaseous phase reaction of benzene, a carboxylic acid and molecular oxygen in the presence of a compound of a noble metal of Group VIII of the Mendeleeff Periodic Table as catalyst.

---

The present invention relates to a process for the manufacture of phenyl esters and, if desired, phenol from benzene.

It has already been proposed to make acetic acid phenyl ester together with diphenyl from benzene and acetic acid in the liquid phase in the presence of palladium acetate by a stoichiometric reaction. This reaction has a poor selectivity as regards phenyl acetate. Measures for carrying out the reaction continuously have not been taught.

The present invent ion provides a process for making phenyl esters and, if desired, phenol from benzene which comprises reacting a mixture of benzene, saturated aliphatic carboxylic acids and molecular oxygen in the gaseous or vaporous phase in the presence of at least one compound of a noble metal of Group VIII of the Mendeleeff Periodic Table, the stable valency of which in its compounds is at most 4.

As carboxylic acids there may advantageously be used saturated aliphatic or cycloaliphatic monocarboxylic acids with up to 8 carbon atoms or mixtures thereof. Exemplary of such substances are propionic acid, butyric acid, isobutyric acid and preferably acetic acid. The acids are advantageously used in as concentrated a form as possible, for example acetic acid in the form of glacial acetic acid. Small amounts of water contained in the acids can be tolerated, however. It is also possible to use mixtures of the carboxylic acids with the corresponding anhydrides.

The oxygen may be added in elementary form or in the form of air. When the reaction components are recycled, pure or substantially pure oxygen is advantageously used.

The starting materials may also contain other substances that do not interfere with the preparation of the desired reaction products, for example, saturated hydrocarbons, noble gases, carbon oxides and water.

As compounds of noble metals those of the elements rhodium, iridium, platinum, ruthenium and advantageously palladium may be used. The noble metal compounds may also be used in admixture with one another or with the noble metals themselves. It is, for example, possible partly to convert the noble metal compounds into the corresponding noble metals in the course of the reaction.

As compounds of the noble metals it is advantageous to use their salts with saturated aliphatic or cycloaliphatic carboxylic acids, and oxides or oxyhydrates of the noble metals. It is particularly advantageous to use the salts of the noble metals with the carboxylic acid to be reacted with benzene and oxygen. There may also be used complex compounds of noble metal salts and unsaturated organic compounds, preferably complex compounds of noble metal salts and aromatic compounds, for example those of benzene. Examples of suitable palladium compounds are palladium oxyhydrate, palladium acetate, palladium propionate, palladium isobutyrate, the palladium salt of cyclohexane carboxylic acid, palladium sulfate, palladium nitrate, the complex compound of benzene and palladium acetate, compounds of alkali metal acylates with palladium acylates, for example compounds of alkali metal acetates and palladium acetate.

The noble metal compounds may be used alone or may advantageously be supported on a carrier in as finely a divided form as possible. Suitable carrier materials are, for example, aluminum oxide, aluminum silicate, silica gel, carbon, zeolites, pumice, clays, feldspars, or molecular sieves.

The noble metal compounds are applied to the carrier by known methods.

The catalyst may be obtained, for example, by impregnating the carrier substance with a solution of the noble metal salt, for example, of palladium acetate in a solution of glacial acetic acid or of the complex compound of palladium acetate and benzene in a benzene solution. Advantageously, the solvent is subsequently wholly or partially removed, for example, by distillation or evaporation. In another form of making the catalyst, certain compounds of the noble metals are only formed on the carrier substance. An example of this mode of proceeding is the preparation of oxyhydrates or oxides by saponification of noble metal chlorides, thermal decomposition of noble metal nitrates or oxidation of the noble metals. It is also possible to thermally treat a catalyst containing, for example, palladium acetate to convert part of the noble metal acylate into the noble metal itself so that noble metal and noble metal compound are simultaneously present on the carrier. This decomposition or reduction may also be carried out during the reaction itself, i.e. in the presence of benzene, carboxylic acid and oxygen.

The concentration of the noble metal compound supported on the carrier may vary within wide limits. In many cases, very small concentrations of these compounds, for example 0.1 to 10% by weight calculated on the total system consisting of carrier and catalyst, are sufficient. It is also possible, however, to obtain phenyl esters and, if desired, phenol using concentrations below 0.1% by weight, for example down to 0.05% by weight or even less. Concentrations above 10% by weight may also be used with success.

Besides noble metal compounds, the catalyst may also contain small amounts, for example up to 50 mol percent, of other metals or metal compounds which are not effective as such. Examples of such substances are gold, copper, silver, iron, manganese and compounds thereof, for example, gold oxide, copper acetate, silver propionate, iron sulfate or manganese phosphate.

Particularly good results are obtained with the additional use of activators. The latter may be salts of strong bases and weak acids, for example, carbonates or acylates of alkali metals or alkaline earth metals, or of zinc or cadmium. Salts that form a buffer system with the carboxylic acid used, for example, sodium phosphates or borax, are also suitable activators. It is particularly advantageous to use as the activator an alkali metal salt of the carboxylic acid to be reacted. When using, for example, acetic acid for the reaction, the activator is generally an alkali metal acetate or a mixture thereof with one of the other above-mentioned acetates. The activator may be present on the carrier in a solid form, having been applied to the carrier, for example, together with the noble metal compound or later. The activator may also be dissolved or suspended in the carboxylic acid to be reacted and may be introduced into the reaction zone together with the said carboxylic acid.

The amounts of activator on the carrier may vary within wide limits and are advantageously within the range of 0.1 to 10% by weight.

The reaction temperatures may vary within wide limits, depending on the choice of the carboxylic acid or the other reaction conditions such as, for example, the boiling temperature of the carboxylic acid under the pressure conditions used or the decomposition temperature of the ester formed. The reaction is advantageously performed at temperatures within the range of 75° C. to 300° C., advantageously 100 to 250° C.

The pressure is not critical. The reaction may be carried out under atmospheric pressure, reduced pressure or superatmospheric pressure. It is generally advantageous to use pressures within the range of 1 to 25 atmospheres absolute, preferably 1 to 10 atmospheres absolute.

The mixing ratios of the individual reactants may vary within wide limits. The reactants are advantageously prevaporized before being brought into contact with the catalyst. In many cases an excess amount of benzene and oxygen is used. When carrying out the process in industry, care must be taken, however, that the mixing ratios of the components are outside the explosive range. Any unreacted amounts of the reaction components, i.e. benzene, carboxylic acid and oxygen, are advantageously recycled.

By the reaction, the phenyl ester of the carboxylic acid used is obtained either alone or, if desired, in admixture with phenol. The mixing ratio of the two products may vary within wide limits depending on the reaction conditions, for example, temperature, pressure, residence time or water content of the catalyst.

The ester or mixture of ester and phenol may be worked up by known methods. The ester may be used as such or converted, if desired, into phenol and carboxylic acid by hydrolysis, in which case the carboxylic acid may be recycled to the reaction zone for making the ester.

Alternatively, the ester may be converted into phenol by thermal splitting. The thermal splitting of acetic acid phenyl ester, for example, yields phenol and ketone. The latter may be used as such or it may be introduced either directly into the reaction zone for making phenyl ester, or if desired after previous reaction to acetic acid or acetic acid anhydride.

The process in accordance with the invention enables valuable aromatic products, i.e. phenyl ester and phenol, to be obtained from commercial starting materials by catalytic oxidation at relatively low temperatures. The process is distinguished by an improved selectivity and is interesting from an economical point of view.

The following examples serve to illustrate the invention, but are not intended to limit it.

EXAMPLE 1

400 cc. sintered silicic acid were impregnated with 6.35 grams palladium acetate and 4.25 grams potassium acetate dissolved in 130 cc. acetic acid. The catalyst so obtained was dried in vacuo at 50° C. and placed in a heatable reaction tube of an internal diameter of 30 mm. Over the catalyst which contained 1.5% by weight palladium and 1.7% by weight potassium there were passed, per hour, at a temperature of the catalyst of 170° C. and a pressure of 5 atmospheres gage, 3.2 moles benzene, 0.64 mole oxygen and 3.2 moles acetic acid which, before being vaporized, contained 0.8% by weight potassium acetate. The gas mixture leaving the reactor was cooled and the condensate which formed was worked up by distillation. 1.4 grams acetic acid phenyl ester and 0.09 gram phenol were obtained per hour. The yield was almost 100% calculated on the benzene used. The starting substances which had not undergone reaction were recycled to the catalyst after separation from the reaction products, the carbon dioxide and the water being removed only partially.

The mixture so obtained consisting of acetic acid phenyl ester and phenol was vaporized, steam was added (molar ratio of water to ester=1:1) and the whole was passed at 600° C. through a quartz tube with a residence time of 12 seconds. By this procedure 72% of the ester was saponified to phenol. The reaction products were separated by distillation. The amount of ester which had not undergone reaction was recycled to the hydrolysis zone while the acetic acid formed was returned to the catalyst zone after separation from the major part of water.

EXAMPLE 2

A prevaporized mixture of 0.1 mole benzene and 0.1 mole acetic acid was passed, per hour, together with 1 liter oxygen and 0.5 liter nitrogen at 170° C. under atmospheric pressure over 75 cc. of a catalyst placed in a heatable glass reactor of an internal diameter of 20 mm. and a length of 300 mm.

The catalyst contained 3% by weight palladium in the form of an oxyhydrate thereof supported on a carrier of silicic acid of a particle size of 0.25 to 0.5 mm. in diameter. To prepare the catalyst, the carrier impregnated with palladium chloride had been stirred into diluted sodium hydroxide solution, thoroughly washed and dried for 1 hour at 130° C. Then 1% by weight potassium and 2% by weight cadmium, in the form of the acetates thereof, had been deposited on the oxyhydrate catalyst.

From the reaction product, 0.4 gram, per hour, of acetic acid phenyl ester could be separated by distillation, which corresponded to an almost 100% selectivity calculated on the benzene which had undergone reaction. The amount of starting material which had not undergone reaction was recycled to the reaction zone.

What is claimed is:

1. A process for the manufacture of phenyl esters or mixtures of phenyl esters and phenol from benzene which comprises reacting a mixture of benzene, a saturated aliphatic carboxylic acid and molecular oxygen in gaseous phase at temperatures within the range of 100–250° C. and under a pressure within the range from 1 to 25 atmospheres absolute in the presence of at least one compound of a noble metal selected from the group consisting of ruthenium, rhodium, palladium, iridium and platinum.

2. A process as claimed in claim 1 wherein the carboxylic acid is an aliphatic monocarboxylic acid with up to 4 carbon atoms or a mixture thereof.

3. A process as claimed in claim 1, wherein the noble metal compound is a salt of the noble metal with a saturated aliphatic carboxylic acid.

4. A process for the manufacture of phenyl esters or mixtures of phenyl esters and phenol from benzene which comprises reacting a mixture of benzene, a saturated aliphatic carboxylic acid and molecular oxygen in gaseous phase at temperatures within the range of 100–250° C. and under a pressure within the range from 1 to 25 atmospheres absolute in the presence of (A) at least one compound of a noble metal selected from the group consisting of ruthenium, rhodium, palladium, iridium and platinum and (B) a carboxylate of an alkali metal or of cadmium.

5. A process as claimed in claim 1, wherein the carboxylic acid is acetic acid.

6. A process as claimed in claim 1, wherein the noble metal compound is an oxide or an oxyhydrate.

7. A process as claimed in claim 1, wherein the saturated carboxylic acid is the carboxylic acid which is reacted with benzene and oxygen.

8. A process as claimed in claim 1, wherein the noble metal compound is a compound of palladium.

9. A process as claimed in claim 1, wherein the noble metal compound is supported on a carrier.

10. A process as claimed in claim 9, wherein the concentration of the noble metal compound on the carrier is in the range of from 0.1 to 10% by weight calculated on the total weight of the carrier/catalyst system.

References Cited

UNITED STATES PATENTS 3,190,912 6/1965 Robinson _____ 260—497
3,221,045 11/1965 McKeon et al. _____ 260—497

FOREIGN PATENTS 1,407,526 6/1965 France _____ 260—497

OTHER REFERENCES

Davidson et al.: Chem. & Ind. (March 1966), p. 457.

JAMES A. PATTEN, Primary Examiner

U.S. Cl. X.R.

260—410.5, 468 R, 621 R